United States Patent [19]

Spiegelstein

[11] Patent Number: 4,807,067

[45] Date of Patent: Feb. 21, 1989

[54] CARTRIDGE TAPE DRIVE

[75] Inventor: Wolfgang Spiegelstein, Glendale, Calif.

[73] Assignee: Irwin Magnetic Systems, Inc., Ann Arbor, Mich.

[21] Appl. No.: 9,448

[22] Filed: Feb. 2, 1987

Related U.S. Application Data

[63] Continuation of Ser. No. 628,110, Jul. 6, 1984, Pat. No. 4,673,995.

[51] Int. Cl.[4] ............... G11B 5/008; G11B 15/00; G11B 17/00
[52] U.S. Cl. ................................. 360/93; 360/96.5; 242/192
[58] Field of Search ............... 360/93, 90, 96.1, 96.5, 360/96.6, 132; 242/197-199, 192

[56] References Cited

U.S. PATENT DOCUMENTS

| | | | |
|---|---|---|---|
| 3,495,835 | 2/1970 | Laa | 274/4 |
| 3,603,743 | 9/1971 | Ban | 179/100.2 |
| 3,697,085 | 10/1972 | Ban | 360/93 |
| 3,913,136 | 10/1975 | Kelch et al. | 242/198 X |
| 3,924,823 | 12/1975 | Cohen et al. | 242/198 |
| 3,976,262 | 8/1976 | Kennedy | 242/192 |
| 3,987,486 | 10/1976 | Ito et al. | 360/96 |
| 4,133,014 | 1/1979 | Righi | 360/96 |
| 4,156,260 | 5/1979 | Joshi | 360/96.1 |
| 4,161,007 | 7/1979 | Haraguchi | 360/137 |
| 4,257,075 | 3/1981 | Wysocki et al. | 360/96.5 |
| 4,303,955 | 12/1981 | Kramer et al. | 360/93 |
| 4,498,112 | 2/1985 | Georgens et al. | 360/96.5 |
| 4,514,775 | 4/1985 | Manning et al. | 360/96.6 |
| 4,556,923 | 12/1985 | Olmsted | 360/93 |
| 4,573,091 | 2/1986 | Barton, Jr. et al. | 360/96.5 |

FOREIGN PATENT DOCUMENTS

| | | |
|---|---|---|
| 1073884 | 3/1980 | Canada. |
| 2823226 | 11/1978 | Fed. Rep. of Germany. |
| 35861980 | 1/1980 | Japan. |

OTHER PUBLICATIONS

"Electronic Design Magazine", Jul. 22, 1982, p. 42.
"Mini-Micro Systems", Jul. 1981, pp. 17-20.
"Data Electronics, Inc.", Microtape EL-1, SL-1.

Primary Examiner—John H. Wolff
Assistant Examiner—David J. Severin
Attorney, Agent, or Firm—Price, Heneveld, Cooper, DeWitt & Litton

[57] ABSTRACT

A cartridge drive adapted for endwise loading of tape cartridges has a retractable friction roll to open the tape access door as the cartridge is loaded into the drive. A pivoted cartridge carriage swings the loaded cartridge across the loading path of travel to an operative position in engagement with the drive motor and magnetic head of the drive. In preferred forms, the drive is dimensioned to fit within the "foot print" of a standard 5¼" floppy disk drive.

10 Claims, 6 Drawing Sheets

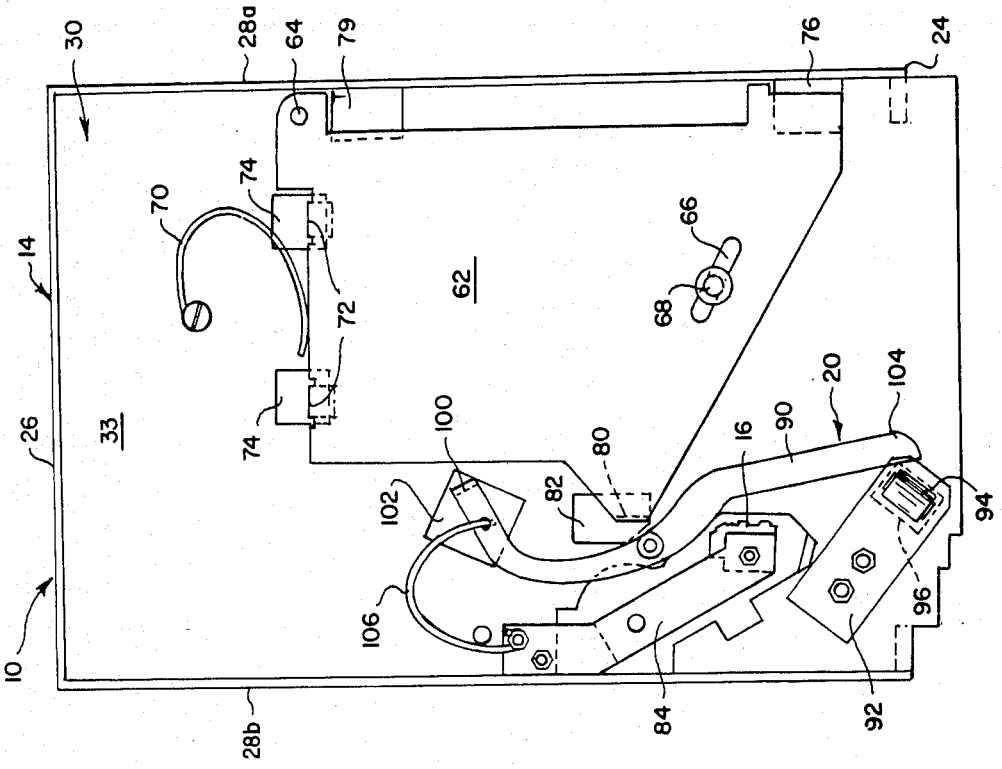
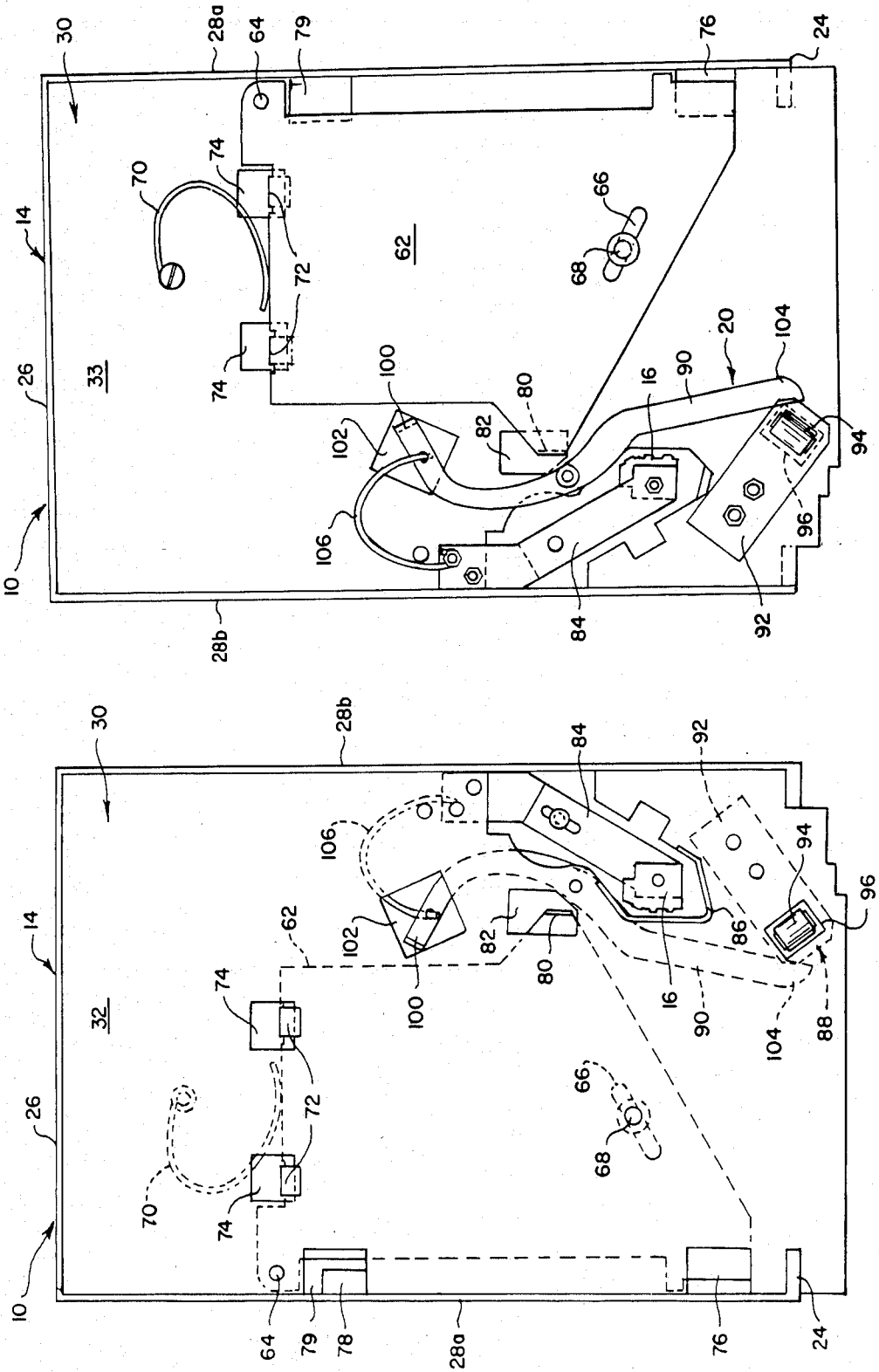

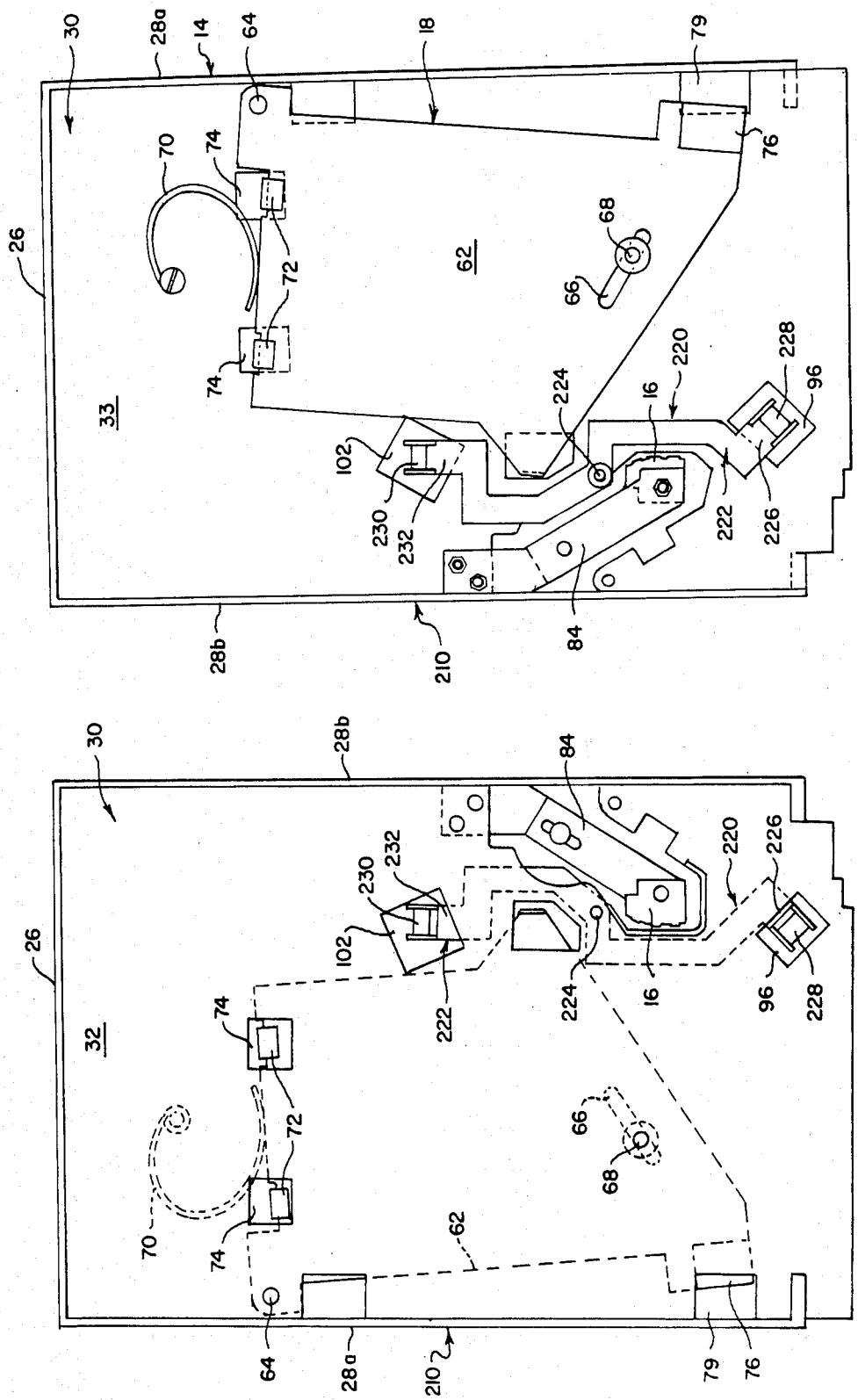

CARTRIDGE TAPE DRIVE

This is a continuation, of application Ser. No. 628,110, filed July 6, 1984, now U.S. Pat. No. 4,673,995.

BRIEF SUMMARY OF THE INVENTION

This invention relates to digital magnetic tape drives in general and particularly concerns a compact drive for standard tape cartridges similar to the type described in American Standard ANSI X3.55—1977 and U.S. Pat. No. 3,692,255 entitled "Belt Driven Tape Cartridge."

In certain applications, it is desirable to have a cartridge tape drive which will fit within the same space requirements, or "footprint", of a digital floppy disk drive. In the case of a 5¼" disk drive, this presents special problems because the width of the 5¼" disk drive footprint is less than the length of the standard ¼" tape cartridge. This dimensional conflict requires that cartridge tape drives adapted to fit within a 5¼" disk drive footprint must be capable of accommodating endwise loading of the standard tape cartridge. Special drive design problems are presented by these requirements inasmuch as the standard tape cartridge was originally designed to be front loaded.

Prior art tape drives are available which are capable of accommodating endwise loading of the standard ¼" tape cartridge. However, the prior art devices have complicated mechanisms for opening the tape access door of the standard cartridge after loading. Additionally, the prior art end-loading drives shift the magnetic head and tape drive motor into engagement with the loaded cartridge in order to actuate the drive. This shifting movement of the drive motor and the head is necessary because the end-loading feature does not permit engagement of these components in the normal manner. A problem with this approach is that the positional accuracy and repeatability requirements for the head and the motor with respect to the cartridge are such that expensive and complicated support mechanisms must be provided in order to permit swinging movement of these components while still maintaining the specified positional and repeatability tolerances.

The device of the present application overcomes the aforementioned problems by providing a simple door-opening mechanism which is operated by movement of the tape cartridge along its loading path of travel and by also eliminating the need to shift the magnetic head and the drive motor to operably engage the cartridge after loading. In this latter regard, the present invention provides for shifting of the cartridge, after it is loaded, to a position wherein it is in engagement with both the drive motor and the magnetic head of the drive. Consequently, the magnetic head and drive motor do not need to be specially supported or moved transverse relative to the cartridge within the drive. The invention of the present application also eliminates power transmission problems by positioning the drive motor in direct drive relationship with the cartridge. These and other advantages of the present invention will become apparent upon examination of the detailed description presented herein below.

BRIEF DESCRIPTION OF THE DRAWINGS

FIG. 1 is a top plan view of a cartridge tape drive constructed in accordance with the principles of the present invention and having portions thereof removed to reveal details of construction;

FIG. 2 is a bottom plan view of the cartridge tape drive shown in FIG. 1 with portions thereof removed to reveal details of construction;

FIG. 11 is a top plan view of a second embodiment of the invention with portions removed to reveal details of construction; and FIG. 12 is a bottom plan view of the embodiment shown in FIG. 11.

DETAILED DESCRIPTION OF THE DRAWING

Figure 5:
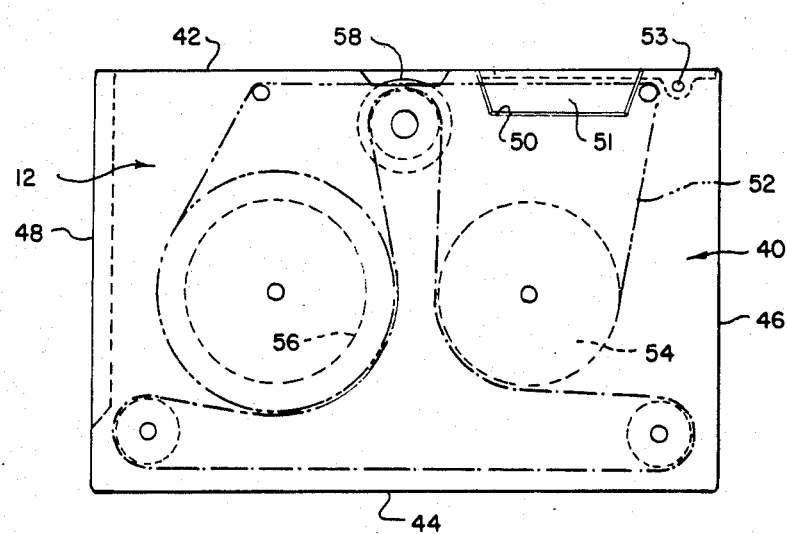
FIG. 5 is a top plan view of a conventional tape cartridge.

In FIGS. 1 and 2 there is shown top and bottom plan views respectively of a digital magnetic tape drive adapted for use with a conventional digital magnetic tape cartridge 12 as broadly shown in FIG. 5. The drive 10 comprises a housing 14 (portions of which have been deleted to reveal details of construction of the drive 10), a magnetic head 16 supported within the housing 14, a cartridge-receiving carriage assembly 18, and a door-opening mechanism 20 for facilitating loading of the cartridge 12 into drive 10 as will be described. The drive 10 also includes a motor (not shown) adapted to operably engage the cartridge 12 during operation of the drive 10; the location of the motor capstan relative to the other components of the drive 10 is shown for reference purposes in broken lines in the drawing and is designated by the numeral 22.

Figure 10:
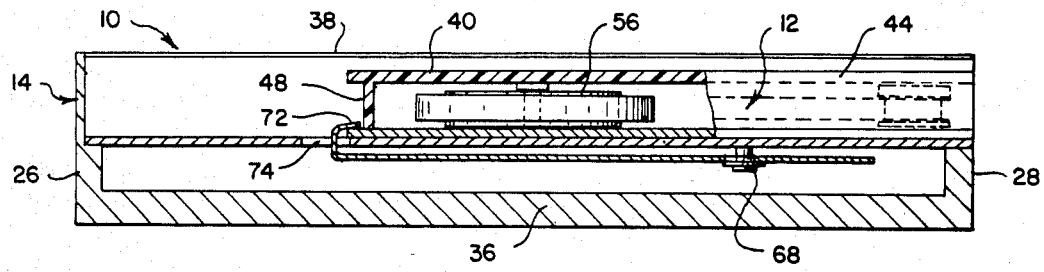
FIG. 10 is a partial cross-sectional taken along line 10—10 of FIG. 8.

The housing 14 has opposed front and back walls 24 and 26, respectively and a spaced pair of sidewalls 28a, 28b extending between the walls 24 and 26. The housing 14 is also provided with a flat, normally horizontally disposed partition 30 having a top surface 32 and a bottom surface 33. The partition 30 is contiguous with the walls 24, 26 and 28 approximately mid-heighth thereof. As shown for example in FIG. 10, the housing 14 has a flat bottom 36 and a top cover 38 to form an enclosure for the other components of the drive 10. A slot (not shown) in the front wall 24 is configured to permit only endwise loading of the cartridge 12 into the housing 14.

The cartridge 12 is generally described in American National Standard ANSI 3.55-1977 entitled "Unrecorded Magnetic Tape Cartridge For Information Interchange, 0.250 inch (6.30 millimeter), 1600 BPI (63 BPMM), Phase EnCoded" which standard is hereby incorporated by reference. As broadly depicted in FIG. 5, the cartridge 12 has a generally flat rectangular body 40 presenting a frontal edge 42, a rear edge 44 and a pair of ends 46 and 48, respectively. An access opening 50 in the front edge 42 of the body 40 permits access to the tape 52 carried on spaced reels 54 and 56, respectively. There is also provided access at the front edge 42 to the tape drive capstan 58.

A channel-shaped door 51 normally covers the access opening 50 to protect the tape 52 when the cartridge 12 is not in use. The door 51 is pivotally mounted on the body 40 by a hinge pin 53 for swinging movement about an axis perpendicular to the plane of the body 40; a spring (not shown) yieldably biases the door 51 to a normally closed position.

Figure 7:
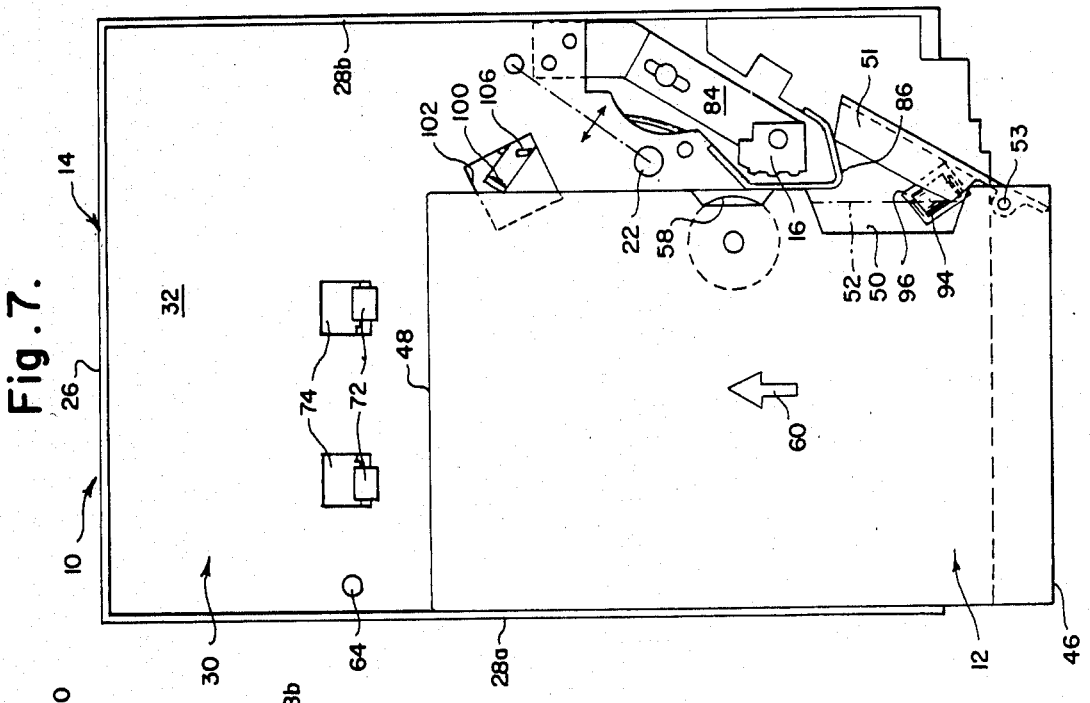
FIG. 7 is a plan view as in FIG. 6 showing the cartridge in the door opening portion of its loading sequence.

The cartridge 12 is adapted to be loaded endwise into the housing 14 through the slot in the front wall 24 along a generally rectilinear loading path indicated broadly by the arrow designated 60 in FIG. 7. The loading path of travel for the cartridge 12 is defined by the carriage assembly 18 and other components of the drive 10 as will be described.

The carriage assembly comprises a plate 62 secured below partition 30 by a pivot 64 for swinging movement in the plane of surface 33. A guideway 66 in the plate 62 spaced from the pivot 64 cooperably receives a rigid guide pin 68 secured to partition 30 for assisting in pivotal movement of the plate 62. As shown for example in FIG. 2 a spring 70 disposed between the partition 30 and the plate 62 biases the latter in a direction away from the head 16 toward the sidewall 28a.

A pair of end lugs 72 project upwardly from the plate 62 through cutouts 74 in the partition 30 and extend above surface 32 for engaging the leading end of the cartridge 12 when the latter is loaded into the drive 10. (It should be noted that when the cartridge 12 is correctly loaded the leading end is end 48). Similarly, the plate 62 provided with a pair of spaced side guides 76, 78 respectively which extend through appropriate cutouts 79 in the partition 30 adjacent sidewall 28a and project upwardly beyond surface 32 for engagement of the cartridge 12. A single side guide 80 is provided on the plate 62 opposite the guides 76, 78 and extends through a cutout 82 in the partition 30 adjacent to the head 16.

The magnetic head 16 is mounted on the partition 30 along the loading path of travel for the cartridge 10 adjacent sidewall 28b by a support arm 84, as shown for example in FIG. 1. The head 16 is secured against movement within the plane of the partition 30 but may be moved in a direction normal to this plane in a manner as is well known in the art. A head guard 86 is provided between the head 16 and the loading path of travel in order to protect the head 16 against damage by inadvertent contact with the cartridge 12 during the loading operation. The guard 86 also assists in the door-opening operation as will be explained herein.

The door-opening mechanism comprises a roller assembly 88 and a lever 90 for selectively shifting the assembly 88 to an operative position. The roller assembly 88 comprises a blade spring 92 mounted on surface 34 of partition 30 and a roller 94 rotatably supported on the free end of the blade spring 92 for rotation about an axis parallel to the plane of partition 30. The roller 94 is biased by the spring 92 toward a door-engaging position wherein the roller 94 projects through a cutout 96 in the partition 30 and projects upwardly from surface 32. The circumferential surface of the roller is comprised of high friction material for grippingly engaging the door 51 of the cartridge 12.

Figure 4:
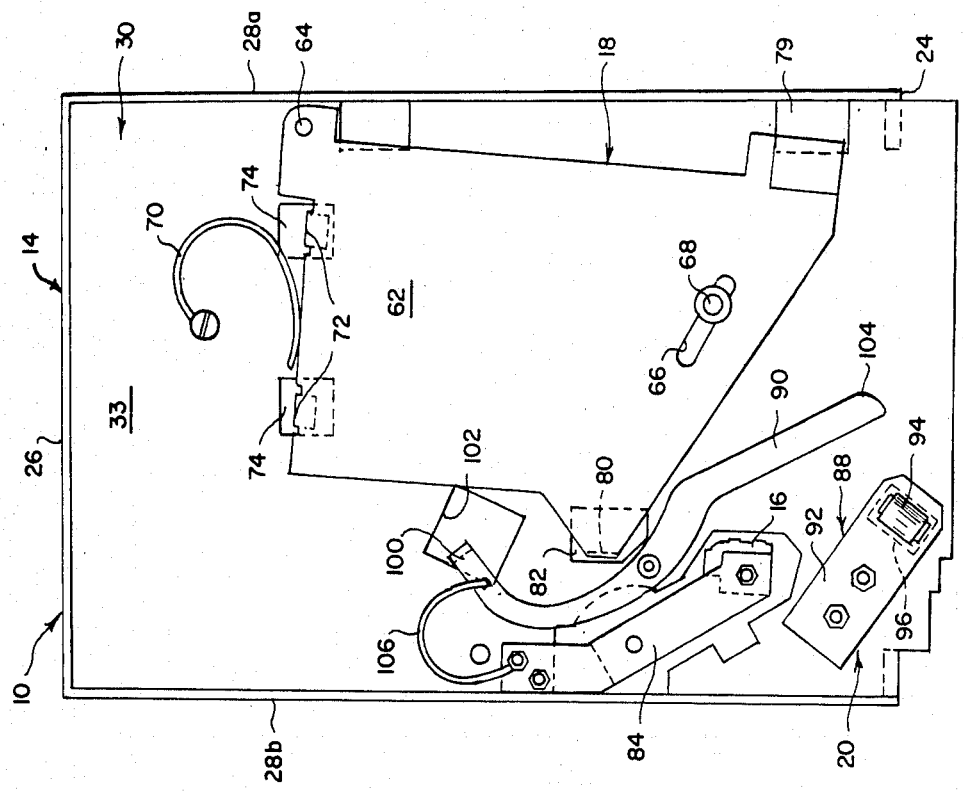
FIG. 4 is a bottom plan view of the drive as shown in FIG. 3.
Figure 3:
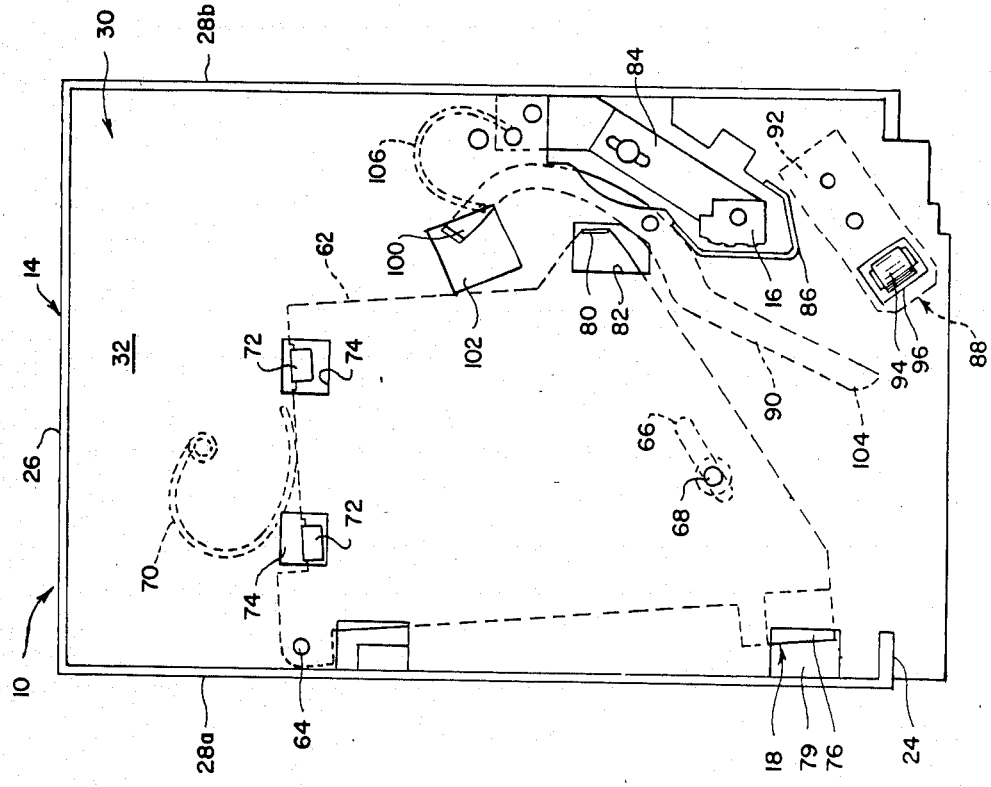
FIG. 3 is a top plan view as in FIG. 1, but showing the tape carriage in the operative position.

The lever 90 is mounted on partition 30 for swinging movement along surface 34 about a pivot 98. One end 100 of the lever 90 projects through a cutout 102 in the partition 30 into the loading path of travel for the cartridge 12 and the other end 104 is adapted to cooperatively engage the roller assembly 88. The lever 90 is pivotable between a first position wherein the end 104 is disposed between the free end of the blade spring 92 and surface 34 such that the roller 94 is retracted beneath the surface 32 (that is, the roller 94 is not in its door-engaging position) and a second position wherein the end 104 is shifted away from the roller assembly 88 such that the spring 92 shifts the roller 94 to its door-engaging position. Lever 90 is shown in its first position in FIGS. 1 and 2, and in its second position, in FIGS. 3 and 4. A spring 106 is provided to bias lever 90 to its first position.

Figure 6:
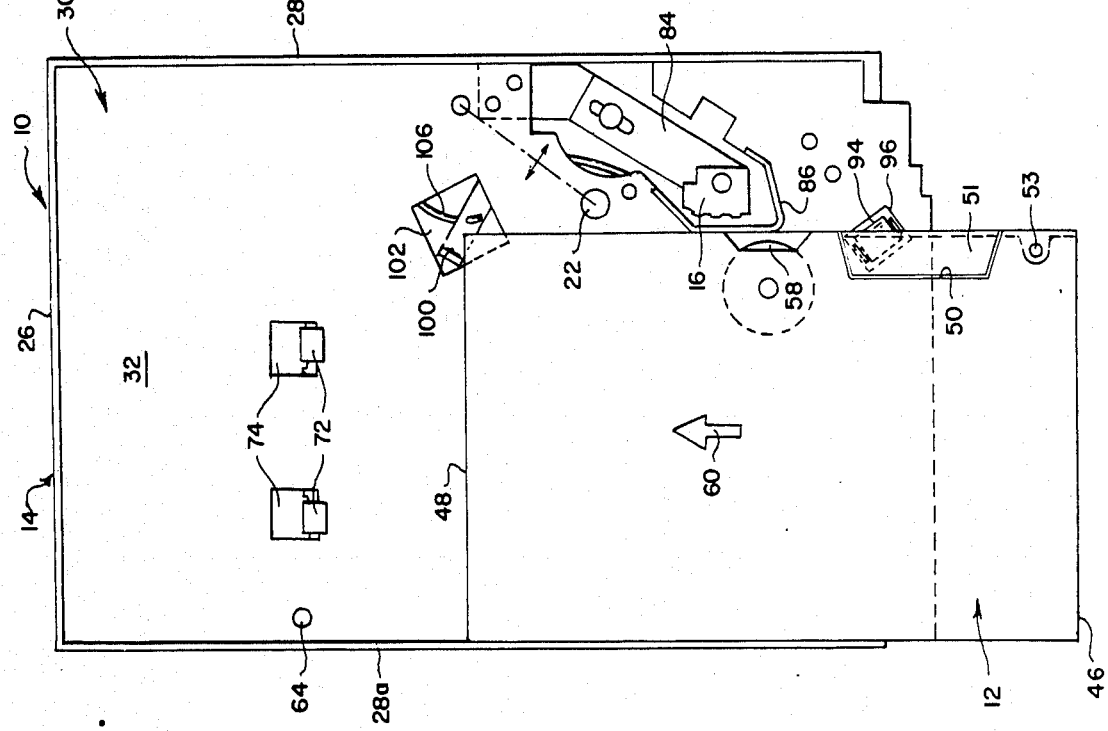
FIG. 6 is a top schematic view of the cartridge tape drive showing the cartridge in an early position in its loading sequence.
Figure 8:
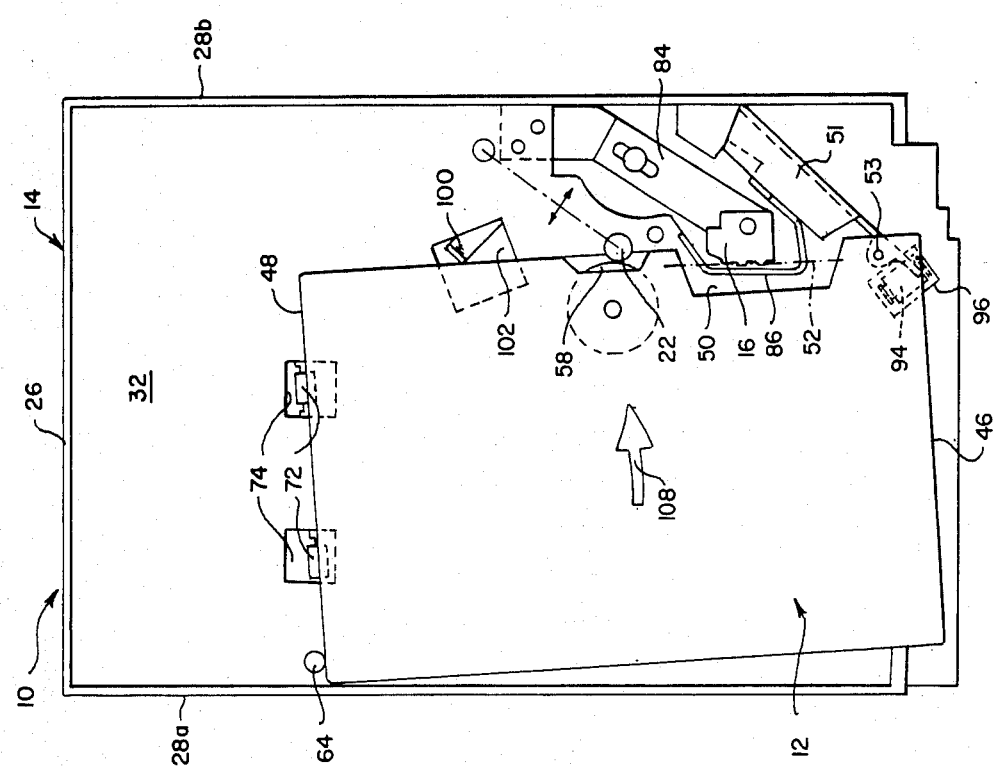
FIG. 8 is a plan view as in FIG. 6 showing the cartridge at the end of its loading path of travel.
Figure 9:
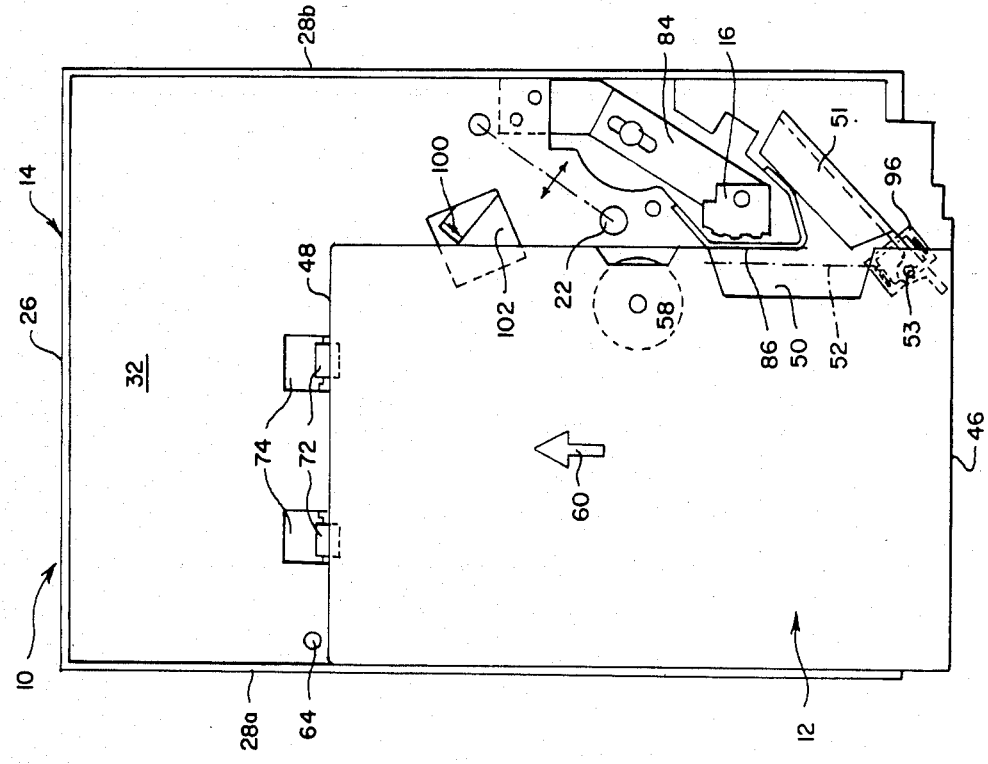
FIG. 9 is a plan view as in FIG. 6 showing the cartridge shifted to its operative position.

An important feature of the present invention is the orientation of the roller 94 relative to the direction of loading as indicated by the arrow 60 in FIG. 6. Specifically in this regard, it is noted that the axis of rotation for the roller 94 is skewed relative to the direction of loading of the cartridge 12 and in preferred forms is disposed at approximately a 45° angle relative to the loading direction. It also should be noted that the lever 90 is configured and dimensioned so that the end 100 is engaged by the leading end 48 of the cartridge 12 during loading at a predetermined point along the path of travel to shift the roller 94 to its door-engaging position when the door 51 is disposed thereabove. This arrangement is best illustrated in FIGS. 6 and 7.

The loading sequence for the cartridge 12 is illustrated in FIG. 6-9. Initially as shown in FIG. 6, the cartridge 12 is manually inserted endwise through the slot in front wall 24 with the leading end 48 of the cartridge 12 entering housing 14 first. When the leading end 48 encounters the end 100 of the lever 90, further movement of the cartridge 12 in the loading direction serves to pivot the lever 90 towards its second position such that the end 104 is shifted from its position interleaved between the surface 34 and the free end 90 of spring 88. Consequently, the roller 94 is shifted to its door-engaging position whereupon the high friction outer surface of the roller comes in contact with the door 51 of the cartridge 12. At this point, further movement of the cartridge 12 in the loading direction causes the door 51 to pivot about its hinge pin 53 because the roller 94 grippingly engages the door 51 thereby resisting further movement of the latter in the loading direction. The door 51 thus swings to the position shown in FIG. 7 as the cartridge is advanced in the loading direction whereupon it is engaged by the guard 86 and continues to swing open as the cartridge 12 approaches its fully loaded positions When the cartridge 12 reaches the position shown in FIG. 8 wherein the leading end 48 of the cartridge engages the end lugs 72 of plate 62, further movement of the cartridge 12 in the loading direction will be resisted. Upon further manual pressure on the cartridge 12 in the loading direction, the plate 62 and the cartridge 12 will be caused to rotate about the pivot 64 toward the head 16 against the biasing of spring 70 as shown broadly by the arrow 108 in FIG. 9. This pivotal movement continues until the cartridge 12 assumes the orientation shown in FIG. 9 wherein the tape 52 is in operable engagement with the head 16 at the access opening 50 and the motor capstan 22 is in engagement with the drive capstan 52. A stop (not shown) precludes further rotation of the plate 62 and a conventional latch (not shown) is also provided to secure the cartridge 12 in its operative position illustrated in FIG. 9. At this point the drive 10 is ready to perform operations on tape 52 of cartridge 12 in a conventional manner.

A second embodiment of the invention is illustrated in FIGS. 11 and 12. A drive 210 is substantially identical in construction and operation as the drive 10, with the exception that a door-opening mechanism 220 replaces the door-opening mechanism 20.

The mechanism 220 comprises a rocker arm 222 mounted on the surface 33 of partition 30 by a pivot 224 for up and down swinging movement about an axis extending generally parallel to the plane of the partition 30. One end 226 of the arm 222 operably supports a roller 228 for rotation about an axis which is generally parallel to the plane of partition 30 and skewed at approximately a 45° angle relative to the loading path of travel of the cartridge 12. The roller 228 is identical to the roller 94 of drive 10.

A second roller 230 is secured on the opposite end 232 of the arm 222 and is adapted to be engaged by the leading end 48 of the cartridge 12 when the latter is loaded into the drive 10. In this regard, the end 232 supports the roller 230 in a manner such that it normally projects upwardly through the cutout 102 in the partition 30. When the roller 230 is engaged by the cartridge 12, further movement of the latter in the loading direction depresses the end 232 thereby causing the rocker arm 222 to teeter about its pivot 224 in a manner to shift end 226 upwardly. Thus, the roller 228 projects through the cutout 96 for engaging and opening the door 51 of the cartridge manner in a manner as has previously been described.

From the foregoing it will be appreciated that the present invention offers significant advantages over prior art cartridge tape drives. The unique arrangement of the roller 94 presents a simple yet highly effective means to accomplish opening of the cartridge door 51 driving the loading process. Swinging of the cartridge 12 to the head 18 eliminates the need for complicated and expensive support structure for the drive motor and the head 18.

I claim:

1. A tape drive for a digital magnetic cartridge of the type having a generally flat rectangular body comprising a pair of mutually spaced ends interconnecting a pair of elongated sides, a longitudinal axis intersecting said ends, and a tape access opening in one of said sides; said drive including:
    a housing adapted to receive said cartridge by manual loading;
    means defining a generally rectilinear loading path of travel within said housing for said cartridge;
    a magnetic head mounted in said housing adjacent said path;
    said housing having a loading slot configured to permit only endwise insertion of the cartridge into the housing thereby requiring lengthwise movement of the cartridge to follow along said loading path of travel,
    means for shifting said transversely of said generally rectilinear loading path to and from engagement with said magnetic head after the cartridge has been inserted endwise into said housing and has traversed at least a portion of said rectilinear loading path,
    said shifting means including a cartridge carriage pivotally mounted within said housing for swinging said cartridge transversely of said loading path toward and away from a position wherein said cartridge is in operable engagement with said head and the longitudinal axis of the cartridge is skewed relative to said generally rectilinear loading path.

2. A tape drive as claimed in claim 1 wherein said carriage comprises a generally flat plate, said plate being provided with a pivot remote from said slot and on the opposite side of said path from said head.

3. A tape drive as claimed in claim 2, said plate having an arcuate guideway formed therein, said housing having rigid guide pin extending into said guideway whereby to facilitate swinging movement of the plate about its pivot.

4. A tape drive as claimed in claim 1, said carriage having means for engaging the leading edge of the cartridge at the end of said path whereby further manual pressure against the cartridge in the loading direction effects swinging of the carriage and cartridge about said pivot toward said head.

5. A tape drive as claimed in claim 4, said shifting means including a spring mounted between said housing and said carriage to bias the latter away from said head.

6. A tape drive as claimed in claim 1, said cartridge having a hinged door normally covering said access opening, said drive including means for opening said door as the cartridge is advanced along said loading path of travel.

7. A tape drive as claimed in claim 6, said opening means comprises a friction member disposed within said path of travel for grippingly engaging said door as the cartridge is loaded into the housing.

8. A tape drive as claimed in claim 7 said friction member comprising a roller rotatably supported within said path of travel.

9. The method of loading a digital tape cartridge into a tape drive adapted to receive the cartridge comprising the steps of:
    inserting the cartridge endwise into the drive and continuing such endwise cartridge motion along a generally rectilinear loading path of travel which lies within a generally flat loading plane contacting pivotal member disposed at least partially in said plane; and
    swinging the pivotal member and the cartridge along a curving path extending generally transversely of said generally rectilinear path of travel while keeping the cartridge within said generally flat loading plane, said curving path leading to a final loaded position in which the cartridge is positioned for recording operation, said final loaded position being disposed within said loading plane.

10. In a tape drive adapted to accommodate endwise loading of a generally rectangular digital magnetic tape cartridge of the type having a tape access opening in one of its longer edges and a hinged, channel-shaped door normally covering said opening, a mechanism for opening said door when the cartridge is loaded into the drive, said mechanism comprising:
    a high friction material member mounted in said drive for movement to and from a door-engaging position at an intermediate location beneath the loading path of said cartridge;
    means for shifting said member upwardly to its door-engaging position when the door is at said location in the loading path;
    said shifting means including means yieldably biasing said member toward said path to grippingly engage a side of the door when the latter is at said location whereby the door is caused to swing progressively away from the access opening as the cartridge is advanced further along the loading path of travel.

* * * * *